(12) United States Patent
Hedlund et al.

(10) Patent No.: US 11,144,043 B2
(45) Date of Patent: Oct. 12, 2021

(54) METHOD AND SYSTEM FOR ALIGNING A TOOL DURING PROGRAMMING OF AN INDUSTRIAL ROBOT

(71) Applicant: ABB Schweiz AG, Baden (CH)

(72) Inventors: Annika Hedlund, Västerås (SE); Ivan Lundberg, Västerås (SE); Jonathan Styrud, Västerås (SE); Martin Nordvall, Västerås (SE); Ralph Sjöberg, Västerås (SE); Tomas Groth, Västerås (SE)

(73) Assignee: ABB Schweiz AG, Baden (CH)

( * ) Notice: Subject to any disclaimer, the term of this patent is extended or adjusted under 35 U.S.C. 154(b) by 583 days.

(21) Appl. No.: 16/061,731

(22) PCT Filed: Feb. 2, 2016

(86) PCT No.: PCT/EP2016/052124
§ 371 (c)(1),
(2) Date: Jun. 13, 2018

(87) PCT Pub. No.: WO2017/133755
PCT Pub. Date: Aug. 11, 2017

(65) Prior Publication Data
US 2018/0373232 A1    Dec. 27, 2018

(51) Int. Cl.
*G05B 19/04*      (2006.01)
*G05B 19/423*    (2006.01)
(Continued)

(52) U.S. Cl.
CPC .......... *G05B 19/423* (2013.01); *B25J 9/1692* (2013.01); *B25J 9/1694* (2013.01); *B23K 9/1087* (2013.01);
(Continued)

(58) Field of Classification Search
CPC ........ G05B 19/423; G05B 2219/45104; G05B 2219/36425; B25J 9/1692; B25J 9/1694; B23K 9/1087
See application file for complete search history.

(56) References Cited

U.S. PATENT DOCUMENTS

| 5,220,498 A | 6/1993 | Ohsawa et al. |
| 6,013,997 A | 1/2000 | Heideman et al. |
(Continued)

FOREIGN PATENT DOCUMENTS

EP       0974884 A2    1/2000

OTHER PUBLICATIONS

International Search Report and Written Opinion of the International Searching Authority Application No. PCT/EP2016/052124 Completed: Oct. 19, 2016; dated Oct. 27, 2016 13 pages.
(Continued)

*Primary Examiner* — Masud Ahmed
(74) *Attorney, Agent, or Firm* — Whitmyer IP Group LLC

(57) ABSTRACT

An industrial robot including a movable robot arm for supporting a tool, and a control unit configured to control the movement of the robot. The control unit is provided with an alignment function for aligning the tool with at least one specified axis. The control unit is configured to supervise the movement of the robot, and to automatically adjust the orientation of the tool so that the tool is aligned with the specified axis upon detecting that the movement of the robot has been stopped and the alignment function is activated. Also disclosed is a method for controlling the industrial robot, and to the use of the method for teaching a robot a path including a plurality of target points by lead-through programming.

20 Claims, 3 Drawing Sheets

(51) Int. Cl.
  *B25J 9/16* (2006.01)
  *B23K 9/10* (2006.01)
(52) U.S. Cl.
  CPC .............. *G05B 2219/36425* (2013.01); *G05B 2219/45104* (2013.01)

(56) References Cited

U.S. PATENT DOCUMENTS

| | | | |
|---|---|---|---|
| 6,124,693 A | 9/2000 | Okanda et al. | |
| 6,492,618 B1 | 12/2002 | Flood et al. | |
| 6,768,078 B1* | 7/2004 | Garza | B23K 11/115 219/87 |
| 7,377,049 B2* | 5/2008 | Lim | G02F 1/1333 33/645 |
| 8,847,100 B2* | 9/2014 | Holcomb | B23K 11/3072 219/109 |
| 2008/0125908 A1 | 5/2008 | Sjoberg | |
| 2009/0125146 A1 | 5/2009 | Zhang et al. | |
| 2010/0174407 A1* | 7/2010 | Fukawa | B23K 26/04 700/245 |
| 2010/0312391 A1 | 12/2010 | Choi et al. | |
| 2012/0143371 A1* | 6/2012 | Seines | G05B 19/423 700/254 |
| 2013/0041505 A1* | 2/2013 | Cox | H01L 21/67742 700/254 |
| 2013/0147944 A1* | 6/2013 | Zhang | G06T 7/80 348/95 |
| 2013/0325179 A1* | 12/2013 | Liao | H01L 21/67259 700/254 |
| 2014/0114478 A1 | 4/2014 | Williams et al. | |
| 2015/0081098 A1* | 3/2015 | Kogan | B25J 9/1656 700/258 |
| 2015/0158180 A1* | 6/2015 | Trompeter | B25J 9/1692 700/254 |
| 2015/0217445 A1 | 8/2015 | Hietmann et al. | |
| 2016/0016317 A1* | 1/2016 | Trompeter | B25J 9/1692 700/254 |
| 2016/0114418 A1* | 4/2016 | Jones | B23K 9/1274 219/124.1 |

OTHER PUBLICATIONS

ABB: "Operator's Manual," Jan. 1, 2005, http://host.bglot.com/ABB/ABB_FlexPendant_Operators_Manual_3HAC16590-1_revB_en.pdf [retrieved on Jun. 11, 2018] section 6.8.4; p. 187.
European Office Action; Application No. 16 702 545.1; dated May 6, 2021; 6 Pages.

* cited by examiner

METHOD AND SYSTEM FOR ALIGNING A TOOL DURING PROGRAMMING OF AN INDUSTRIAL ROBOT

TECHNICAL FIELD

The present invention relates to an industrial robot having a movable robot arm for supporting a tool, wherein the robot is provided with an alignment function for aligning the tool with at least one specified axis. The present invention also relates to a method for controlling a robot provided with an alignment function for aligning the tool with at least one specified axis. The invention further relates to use of the method for lead-through programming of a robot.

BACKGROUND

An industrial robot includes a mechanical structure, also denoted a manipulator, and a control unit for controlling the movements of the manipulator. The manipulator has a plurality of arm parts that are movable relative each other about a plurality of joints. At least one of the arm parts is adapted to support a tool. Most robots have the ability to rotate the tool about three orthogonal axes, and by that to align the tool with any desired axis in the surroundings of the robot.

There exist several methods to program industrial robots to perform a task. The programming of the robot can, for example, be done by teaching the robot the movements needed to perform the task by moving the robot along a desired operating path while recording the movements of the robot. The operating path includes a sequence of target points, which define the operating path that the robot shall follow at run-time. During the teaching, the robot is guided through the various target points along the operating path, and the position and orientation of the robot in the target points are stored in a memory of the robot. The target points could be taught by a number of methods. A preferred method for teaching the robot the target points is called lead-through programming. During the lead-through programming, a robot operator manually moves the robot arm with the tool using his hands.

US2015/0081098 discloses lead-through programming of a robot having a force sensor. The sensor detects a guidance force applied to the robot arm by an operator. The movements of the robot are controlled using force control in such manner that a pre-specified reference point associated with the robot arm is moved only in a selected direction as a result of movement of the robot arm by the operator during manually-guided adjustment of the position and orientation of the robot arm.

During robot teaching by lead-through it is often desired to work with the tool aligned to an axis in the surroundings of the robot. For example, for gluing and arc welding applications it is necessary to keep the tool vertical to enable the glue and solder to flow smoothly. However, it is very difficult to do this alignment by hand. It is known to have an alignment function which upon activation aligns the tool with an axis in a world coordinate system. With a world coordinate system is meant a coordinate system defined in relation to a fixed point in the surroundings of the robot. The alignment function has to be activated manually by clicking a button on an HMI or a portable teach pendant unit (TPU) each time the alignment is to be performed. Upon clicking the button, the tool orientation is adjusted such that the z-axis of the tool is aligned with the alignment axis. If the tool is to be aligned with the alignment axis during an entire task, the alignment function has to be activated for each of the target points on the path. In order to click the button and activate the alignment function, the robot operator has to move one or both hands from the robot arm to the HMI/TPU. A problem is that this causes disturbances in the programming and the robot operator may lose focus on the robot.

SUMMARY

It is an object of the present invention to at least partly overcome the above problems, and to help the robot operator to perform a desired alignment, without having to activate the alignment manually each time.

This object is achieved by a method according to the invention.

The method comprises:
activating the alignment,
detecting movement of the robot, and
automatically adjusting the orientation of the tool so that the tool is aligned with the specified axis upon detecting that the movement of the robot has been stopped.

According to the invention, the system automatically performs a tool alignment when the movement of the robot has been stopped and the alignment function is activated. This means that the user has stopped moving the robot, e.g. by lead-through or other means. The alignment is initiated by the robot operator by stop moving the robot arm. Preferably, the alignment function is activated during the entire teaching session. This means that the alignment function only has to be activated once during the teaching session. Alternatively, the alignment function is automatically activated when the robot is switched to teach mode.

The invention makes it possible to repeat the alignment for each target point during one teaching session without the need to click any button on the HMI/teach pendant. The method according to the invention saves time and increases the overall ease of use. The invention also provides faster and more accurate teaching, faster commissioning as well as better feel, especially regarding ease of use. Preferably, the method is repeated as long as the alignment function is activated.

The specified axis can be any linear axis in the surroundings of the robot. For example, the axis can be a vertical line.

With the term "automatically" is meant that the step is carried out by a machine, for example, the control unit of the robot.

The invention is particularly useful for teaching the robot a path including a plurality of target points by means of lead-through programming.

According to an embodiment of the invention, the method comprises adjusting the orientation of the tool so that the tool is aligned with the specified axis upon detecting that the movement of the robot has been stopped for a defined time period. The system automatically performs the tool alignment when the robot holding the tool has been standing still for a certain time period and the alignment function is activated. Thus, the tool alignment is initiated a certain time period, e.g. 1 second, after the operator has stopped moving the robot. This embodiment ensures that the alignment is not initiated by mistake if the operator stops moving the arm for a short time.

According to an embodiment of the invention, the orientation of the tool is kept aligned with the specified axis until detecting that the movement of the robot has been resumed. The tool is kept aligned with the specified axis as long as the robot is standing still. Thus, it is possible to keep the tool aligned with the specified axis when the position and orientation of the robot is recorded, for example, at the target points.

According to an embodiment of the invention, the method comprises releasing the alignment of the tool upon detecting that the movement of the robot has been resumed. The tool is no longer aligned with any axis when the robot is moving, and the robot operator is free to change the orientation of the tool during movement of the robot. Thus, the robot operator can reorient the tool during movement of the robot, which makes it possible to change alignment from one specified axis to another specified axis during the teaching session.

According to an embodiment of the invention, the method comprises:
 determining the angle of the tool in relation to the specified axis, and
 adjusting the orientation of the tool so that the tool is aligned with the specified axis if the angle of the tool in relation to the specified axis is less than a limit value. Preferably, the limit value is less than 45°, and more preferably less than 30°.

Thus, the tool automatically "snaps" to the specified axis if the angle between the tool and the specified axis is less than a specific limit value, and it has been detected that the robot is standing still. If there are more than one specified axes, the tool may automatically "snap" to the nearest axis.

According to an embodiment of the invention, a plurality of orthogonal axes have been specified, and the method comprises:
 determining the orientation of the tool by computing the angles of the tool in relation to the specified axes, and
 adjusting the orientation of the tool so that the tool is aligned with the nearest of the specified axes. More than one axis can be specified, for example, the X, Y and Z-axes in a world coordinate system can be specified. This embodiment makes it possible to change alignment e.g. from X to Z during one teaching session without the need to click any button on the HMI/teach pendant. The tool may automatically "snap" to the nearest of the specified axes when the operator stops moving the robot and the alignment function is activated. The snap alignment saves time and increases the ease of use.

According to an embodiment of the invention, the tool is aligned with the nearest of the specified axes if the angle of the tool in relation to the nearest axis is less than a limit value. The tool is then aligned along e.g. X, Y or Z axis depending on which axis the tool direction is closest to if the difference in angle is less than a specific limit.

According to an embodiment of the invention, the robot is teached a path including a plurality of target points, the method comprises:
 activating the alignment function,
 manually moving the robot with the tool towards a target point on the path,
 detecting when the movement of the robot has been stopped,
 automatically adjusting the orientation of the tool so that the tool is aligned with the nearest specified axis upon detecting that the movement of the robot has been stopped at the target point,
 storing the position and orientation of the robot at the target point,
 manually moving the robot with the tool towards the next target point,
 detecting when the movement of the robot has been resumed,
 releasing the alignment of the tool upon detecting that movement of the robot has been resumed, and
 repeating the method until the last target point on the path has been taught.

This embodiment facilitates programming of an operating path with a large number of target points when it is required that the tool is aligned with a specified axis in the surroundings of the robot. If more than one axis has been specified, the orientation of the tool is adjusted so that the tool is aligned with the nearest of the specified axes when it has been detected that the movement of the robot has been stopped at the target point.

The object of the invention is also achieved by an industrial robot according to an embodiment of the invention.

The robot comprises a movable robot arm for supporting a tool, and a control unit configured to control the movement of the robot arm, wherein the control unit is provided with an alignment function for aligning the tool with at least one specified axis. The control unit is configured to detect the movement of the robot, and automatically adjust the orientation of the tool so that the tool is aligned with the specified axis upon detecting that the movement of the robot has been stopped and the alignment function is activated. The control unit is configured to supervise the movement of the robot and automatically adjust the orientation of the tool so that the tool is aligned with the specified axis upon detecting that the movement of the robot has been stopped.

According to an embodiment of the invention, the control unit is configured to adjust the orientation of the tool so that the tool is aligned with the specified axis upon detecting that the movement of the robot has been stopped for a defined time period.

According to an embodiment of the invention, the control unit is configured to keep the tool aligned with the specified axis until detecting that the movement of the robot has been resumed.

According to an embodiment of the invention, the control unit is configured to release the alignment of the tool upon detecting that the movement of the robot has been resumed.

According to an embodiment of the invention, the control unit is configured to determine the angle of the tool in relation to the specified axis, and to adjust the orientation of the tool so that the tool is aligned with the specified axis upon detecting that the movement of the robot has been stopped and if the angle of the tool in relation to the specified axis is less than a limit value.

According to an embodiment of the invention, a plurality of orthogonal axes have been specified, and the control unit is configured to determine the orientation of the tool, to compute the angles of the tool in relation to the specified axes, and to adjust the orientation of the tool so that the tool is aligned with the nearest of the specified axes when it has been detected that the movement of the robot has been stopped.

According to an embodiment of the invention, the control unit is configured to determine if the computed angle is less than a limit value, and to aligned the tool with the nearest of the specified axes if the angle of the tool in relation to the nearest axis is less than the limit value.

BRIEF DESCRIPTION OF THE DRAWINGS

The invention will now be explained more closely by the description of different embodiments of the invention and with reference to the appended figures.

DETAILED DESCRIPTION

Figure 1:
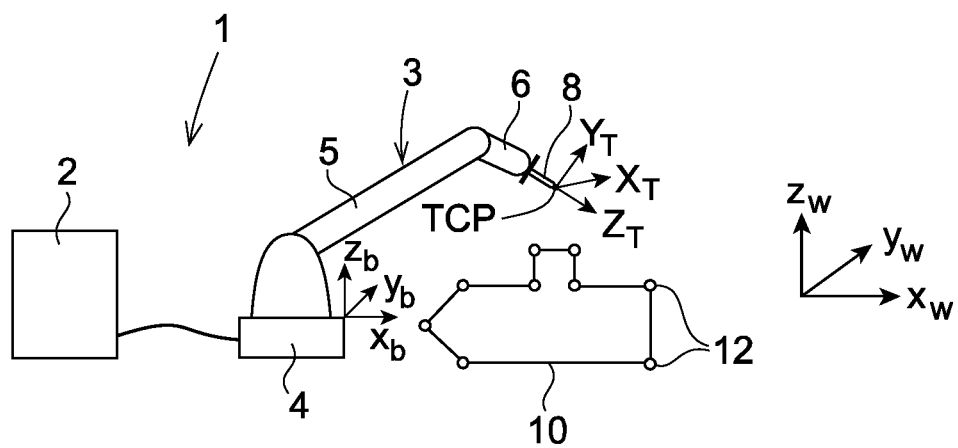
FIG. 1 shows an example of an industrial robot and an operating path to be taught.

FIG. 1 shows an example of an industrial robot 1 according to the invention. The robot 1 comprises a robot control unit 2 and a manipulator 3. The manipulator 3 comprises a plurality of parts that are movable relative to each other about a plurality of joints under the control of the control unit 2. In this example, the manipulator 3 has a stationary base 4, an arm part 5 that is rotatable about the stationary base and supports a wrist 6 that is rotatable about a plurality of joints. The wrist 6 supports a tool 8, in which an operating point, called TCP (Tool Centre Point), is defined. The TCP is defined in six degrees of freedom: three positional coordinates and three angles. The position and orientation of the TCP is, for example, given by the positions of the joints of the robot, and can be calculated based on the signals from the position sensors of the robot. Optionally, the manipulator can be provided with a force sensor for providing information to the control unit about a desired movement direction during lead-through programming, as described in US2015/0081098.

The control unit includes software as well as hardware, such as input and output means, a processor unit including one or more central processing units (CPU) for handling main functions of the robot controller, such as executing robot programs. The control unit has a storage medium for storing data, software and program code for controlling the movements of the manipulator.

The movements of the joints are driven by motors. The positions of the joints are controlled by the control unit 2. The joints are equipped with position sensors, for example angle-measuring devices, to provide position feedback to the control unit 2. The position and orientation of the TCP is given by the positions of the joints of the robot, and can be calculated based on the position feedback from the position sensors of the robot.

The robot may have a plurality of defined coordinate systems. A tool coordinate system $X_T, Y_T, Z_T$ is defined for the tool. If the tool is elongated, the Z-axis of the tool coordinate system is usually defined along a length axis of the tool. The origin of the tool coordinate system is located in the TCP. A robot base coordinate system $X_B, Y_B, Z_B$ is usually defined in the stationary base 4 of the robot. The relation between the tool coordinate system and the base coordinate system is known. The position and orientation of the TCP can be determined in the base coordinate system of the robot based on the position feed-back from the position sensors and the known relation between the tool coordinate system and the base coordinate system. A world coordinate system $X_W, Y_W, Z_W$ is defined somewhere in the surroundings of the robot. The $Z_W$-axis of the world coordinate system is commonly aligned with the vertical line. The relation between the world coordinate system and the base coordinate system is known. Thus, it is possible to determine the position and orientation of the TCP in the world coordinate system. In some applications, the world coordinate system coincides with the base coordinate system of the robot. If the robot is to carry out work on a work object, an object coordinate system is defined for the object.

The control unit 2 is provided with an alignment function for aligning the tool with at least one specified axis, in the following named alignment axis. The alignment axis is, for example, the $Z_W$-axis of the world coordinate system or one of the axes in the object coordinate system. More than one alignment axes can be specified. For example, the $X_W, Y_W, Z_W$ axes of the world coordinate system can be specified as alignment axes, or one or more of the axes in the object coordinate system can be specified as the alignment axes. Preferably, the axis/axes are specified in advance and stored in the memory storage of the control unit 2. It is also selected which one of the axes in the tool coordinate system to be aligned with the alignment axis. For example, the $Z_T$-axis of the tool coordinate system can be selected as the axis to be aligned with the alignment axis.

Suitably, the alignment function is implemented as a software module executed by the processing unit of the control unit 2. The alignment function can be activated and deactivated. Suitably, the alignment function is activated during programming of the robot, and is turned off when the programming is finished. The alignment function can be activated manually by a user, for example, by clicking a button, or automatically, for example, when the robot is switched to teach mode or lead-through programming is initiated. In the same way, the alignment function can be deactivated manually or automatically when the teach mode has been switched off.

According to the invention, the control unit 2 is configured to supervise the movement of the robot as long as the alignment function is activated, and to automatically adjust the orientation of the tool so that the tool is aligned with the selected axis when it has been detected that the movement of the robot has been stopped. In one embodiment of the invention, the control unit is configured to align the tool with the alignment axis upon detecting that the movement of the robot has been stopped for a defined time period. Suitably, the time period is a few seconds, for example, the time period is one second. The control unit is configured to keep the tool aligned with the selected axis as long as the robot is standing still. The alignment of the tool is, for example, released upon detecting that the movement of the robot has been resumed. Thus, the tool is not automatically aligned with the alignment axis when the robot is moving.

In one embodiment of the invention, the control unit is configured to determine the angle of the tool in relation to the alignment axis, and to adjust the orientation of the tool so that the selected tool axis is aligned with the alignment axis if the angle between the selected tool axis and the alignment axis is less than a limit value. For example, the alignment is carried out if the angle between the tool and the alignment axis is less than 45°. In another example, the alignment is carried out if the angle between the tool and the alignment axis is less than 30°. Thus, the tool is automatically aligned to the alignment axis if the alignment function is activated, the movement of the robot has been stopped, and the angle between the selected tool axis and the alignment axis is less than the limit value. When a plurality of axes have been specified, the control unit is configured to compute the angles between the selected axis of the tool and the alignment axes, to determine which one of the alignment axes the tool is nearest, and to adjusting the orientation of the tool so that the tool is aligned with the nearest of the alignment axes. Thus, the tool "snaps" to the nearest of the alignment axes when it has been detected that the movement of the robot has been stopped. In one embodiment of the invention, the tool is aligned with the nearest of the alignment axes if the angle of the tool in relation to the nearest axis is less than a limit value.

FIG. 1 discloses an example of a path 10. The path 10 comprises a plurality of target points 12. The following example describes how the invention can be used for teaching the robot a path of a plurality of target points. First, the alignment function is activated and the robot is switched to teach mode. The operator manually moves the robot arm with the tool towards the first target point on the path, for example, by lead-through. The operator stops the movement of the robot arm when the target point has been reached. The control unit supervises the movement of the robot, and detects when the movement of the robot has been stopped at the target point. When the robot has stand still for more than a certain time period, the control unit automatically adjusts the orientation of the tool so that the tool is aligned with the alignment axis. The position and orientation of the robot at the target point is stored. The operator manually moves the robot with the tool towards the next target point. The control unit detects when the robot is moving, and releases the alignment of the tool upon detecting that the movement of the robot has been resumed. This is repeated for each target point 12 on the path 10, until the last target point on the path has been taught.

Figure 2A:
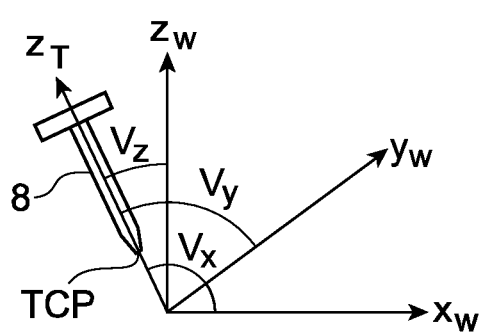
FIG. 2a shows an example of a tool and a plurality of specified axes.
Figure 2B:
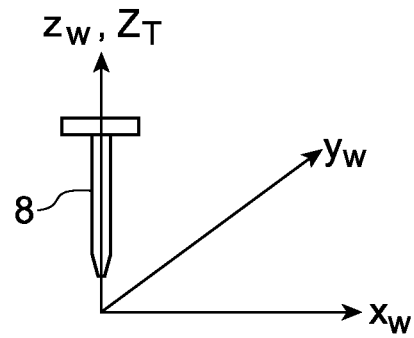
FIG. 2b shows the tool in FIG. 2a aligned with the nearest of the specified axes.

FIG. 2a shows the tool 8 in relation to the axes $X_W$, $Y_W$, $Z_W$ in the world coordinate system. In this example, the $X_W$, $Y_W$, $Z_W$ axes in the world coordinate system have been specified as the alignment axes, and the $Z_T$ axis of the tool coordinate system has been selected to be aligned with the axes in the world coordinate system. The angles $V_x$, $V_y$, $V_z$ between the $Z_T$ axis of the tool coordinate system and the alignment axes $X_W$, $Y_W$, $Z_W$ of the world coordinate system are computed when the movement of the robot has been stopped. As seen from the figures, the $Z_T$ axis of the tool coordinate system is closest to the $Z_W$ axis of the world coordinate system. The control unit is then controlling the movement of the robot so that the $Z_T$ axis of the tool coordinate system is aligned with the $Z_W$ axes of the world coordinate system, as shown in FIG. 2b.

To be able to compute the angles $V_x$, $V_y$, $V_z$ between the axis of the tool and the specified alignment axes, the axis of the tool and the alignment axes must be transformed to the same coordinate system. In this example, it is suitable to transform the axis of the tool to the world coordinate system. This can be done by reverse transformation of the robot kinematic and knowledge of the relation between the robot base coordinate system and the world coordinate system. The position of the tool in the tool coordinate system is given by the TCP. When the axis of the tool and the specified alignment axes have been transformed to the same coordinate system, the angles $V_x$, $V_y$, $V_z$ can be computed with common vector mathematics.

Figure 3:
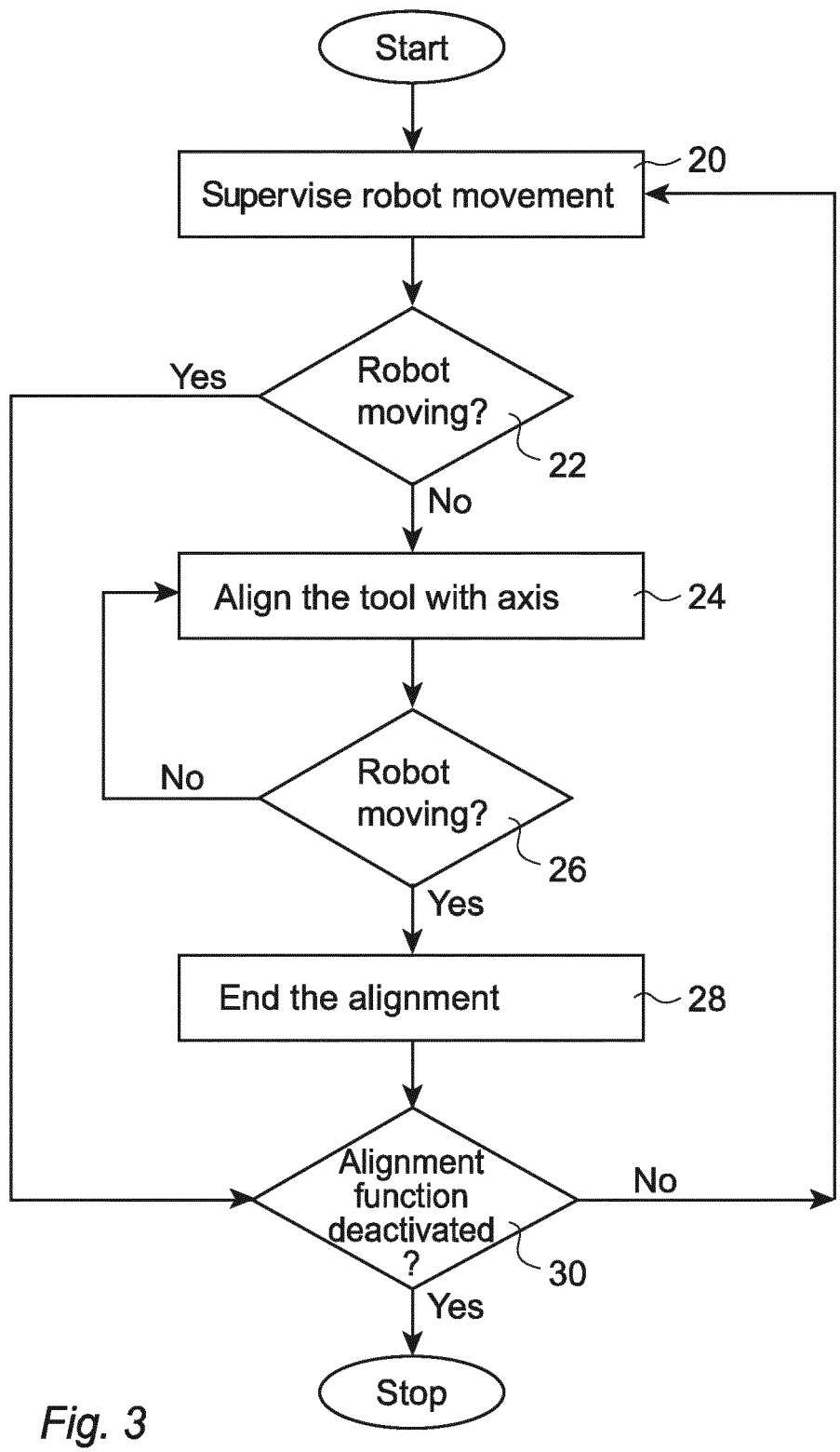
FIG. 3 shows a flow chart of a first embodiment of the invention.

FIG. 3 shows a flow chart of a method according to a first embodiment of the invention. It will be understood that each block of the flow chart can be implemented by computer program instructions. An alignment axis and an axis of the tool to be aligned with the alignment axis have been defined in advance. The operator switches the robot to teach mode before starting the programming of the robot. The method is started upon activation of the alignment function and is repeated until the alignment function is deactivated. The movements of the robot is supervised in order to detect when the operator has stopped moving the robot, block 20. The supervision is, for example, done by supervising the velocity of the robot joints. If the velocities of the robot joints are zero, the movement of the robot has been stopped. Alternatively, the supervision can be done by supervising the output signal from the force sensor used for the lead-through programming. If the output signal from the force sensor is zero, the robot is not moving provided that the robot is in teach mode.

When it has been detected that the movement of the robot has been stopped, the angle between the tool axis and the alignment axis is computed, and it is determined how to control the movements of the robot so that the angle between the tool axis and the alignment axis becomes zero or at least close to zero. This may include to determine the positions of the robot joints and to generating motor references to the motors of the robot. The orientation of the tool is then adjusted so that the tool is aligned with the alignment axis, block 24. Optionally, the alignment is performed a certain period of time after it has been detected that the movement of the robot has been stopped, and the movement of the robot has not yet been resumed. The alignment of the tool axis is continued until it has been detected that the movement of the robot has been resumed, block 26. Thus, the supervision of the movements of the robot continues when the robot stands still in order to detect when the robot begins to move again. Upon detecting that the robot movement has been resumed, the alignment is ended, block 28. Thus, the operator is allowed to reorient the tool. The supervision of the movements of the robot continues until the next time the movement of the robot is stopped. The method steps 20-28 are repeated as long as the alignment function is activated, block 30.

Figure 4:
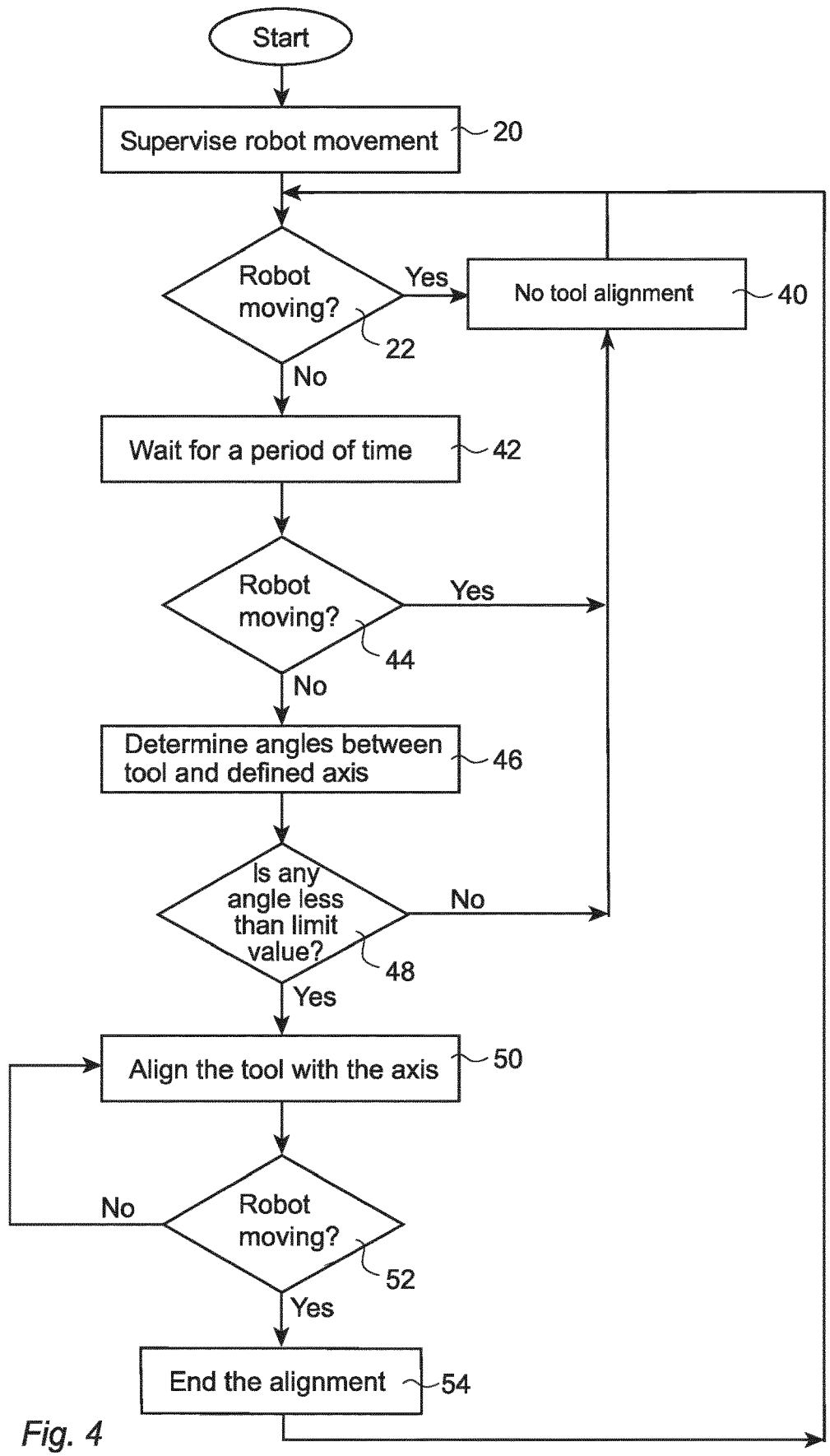
FIG. 4 shows a flow chart of a second embodiment of the invention.

FIG. 4 shows a flow chart of a second embodiment of the invention. A plurality of alignment axes, and a tool axis to be aligned with the alignment axes have been specified in advance. Preferably, the specified alignment axes are orthogonal. Further, a time period has been defined. The time period sets the delay time for start of the alignment after it has been detected that the movement of the robot has been stopped. In this embodiment, a limit value for the angle between the tool axis and the alignment axes has been specified. The alignment is only carried out if the angle between the tool axis and the alignment axis is less than the limit value. Preferably, the limit value is selected such that only one of the axes will fulfill the requirement to be less than the limit value at the same time. If the alignment axes are orthogonal, the limit value preferably is less than 45 degrees.

The method is started upon activation of the alignment function, and is repeated until the alignment function is deactivated. The movement of the robot is supervised as described above. As long as the robot is moving, there is no alignment of the tool, block 40. When it has been detected that the operator has stopped moving the robot, the method waits for a certain period of time, block 42, and if the robot has not been moved during this period of time, block 44, the angles between the axis of the tool and the alignment axes are determined, block 46. The determined angles are compared to the limit value, block 48. If none of the determined angles is less than the limit value, no tool alignment is performed, block 40. If one of the determined angles is less than the limit value, the tool axis is aligned with this axis, block 50. If more than one of the determined angles is less than the limit value, the tool is aligned with the nearest of the alignment axes.

The alignment of the tool axis is continued until it has been detected that the operator moves the robot again, block 52. Upon detecting that the robot movement has been resumed, the alignment is ended, block 54. The operator can then choose to reorient the tool so that the axis of the tool is closer to any of the other alignment axes. The supervision of the movement of the robot continues until the next time the operator stops moving the robot. The tool is then aligned to the nearest of the alignment axes. Thus, the operator can choose which one of the axes the tool is to be aligned with. The operator can trigger the alignment by stop moving the robot for a certain timer period, and the tool is kept aligned with the alignment axis as long as the robot is not moving. This gives the operator time to record the position and orientation of the tool in the target point. When the target point has been recorded, the operator moves the robot arm with the tool to the next target point to be recorded. The method steps 20-52 are repeated as long as the alignment function is activated

The invention claimed is:

1. A method for controlling an industrial robot having a movable robot arm for supporting a tool, wherein the robot is provided with an alignment function for aligning the tool with at least one specified axis ($X_w$, $Y_w$, $Z_w$), wherein the method comprises:
activating the alignment function,
detecting movement of the robot, and
automatically adjusting the orientation of the tool so that the tool is aligned with the specified axis upon detecting that the movement of the robot has been stopped.

2. The method according to claim 1, wherein the method includes adjusting the orientation ($Z_T$) of the tool so that the tool is aligned with the specified axis ($X_w$, $Y_w$, $Z_w$) upon detecting that the movement of the robot has been stopped for a defined time period.

3. The method according to claim 1, wherein the tool is kept aligned with the specified axis ($X_w$, $Y_w$, $Z_w$) until detecting that the movement of the robot has been resumed.

4. The method according to claim 1, wherein the method includes releasing the alignment of the tool upon detecting that movement of the robot has been resumed.

5. The method according to claim 1, wherein the method includes:
determining the angle ($V_x$, $V_y$, $V_z$) of the tool in relation to the specified axis, and
adjusting the orientation of the tool so that the tool is aligned with the specified axis ($X_w$, $Y_w$, $Z_w$) if the angle of the tool in relation to the specified axis is less than a limit value.

6. The method according to claim 4, wherein the limit value is less than 45°, and preferably less than 30°.

7. The method according to claim 1, wherein a plurality of axes ($X_w$, $Y_w$, $Z_w$) have been specified, and the method includes:
computing the angles ($V_x$, $V_y$, $V_z$) of the tool in relation to the specified axes, and
adjusting the orientation of the tool so that the tool is aligned with the nearest of the specified axes upon detecting that the movement of the robot has been stopped.

8. The method according to claim 7, wherein the tool is aligned with the nearest of the specified axes ($X_w$, $Y_w$, $Z_w$) if the angle ($V_x$, $V_y$, $V_z$) of the tool in relation to the nearest axis is less than a limit value.

9. The method according to claim 1, wherein the method is repeated as long as the alignment function is activated.

10. The method according to claim 1, wherein the robot is taught a path including a plurality of target points, and the method includes:
activating the alignment function,
manually moving the robot with the tool towards a target point on the path,
detecting when the movement of the robot has been stopped,
automatically adjusting the orientation of the tool so that the tool is aligned with the specified axis ($X_w$, $Y_w$, $Z_w$) upon detecting that the movement of the robot has been stopped,
storing the position and orientation of the robot at the target point,
manually moving the robot with the tool towards the next target point on the path,
detecting when the movement of the robot has been resumed,
releasing the alignment of the tool upon detecting that the movement of the robot has been resumed, and
repeating the method until the last target point on the path has been taught.

11. A method of teaching a robot a path including a plurality of target points by lead-through programming, comprising the steps of:
activating the alignment function,
detecting movement of the robot, and
automatically adjusting the orientation of the tool so that the tool is aligned with the specified axis upon detecting that the movement of the robot has been stopped.

12. An industrial robot comprising a movable robot arm for supporting a tool, and a control unit configured to control the movement of the robot, wherein the control unit is provided with an alignment function for aligning the tool with at least one specified axis ($X_w$, $Y_w$, $Z_w$), wherein the control unit is configured to detect the movement of the robot, and to automatically adjust the orientation of the tool so that the tool is aligned with the specified axis upon detecting that the movement of the robot has been stopped and the alignment function is activated.

13. The robot according to claim 12, wherein the control unit is configured to keep the tool aligned with the specified axis until detecting that the movement of the robot has been resumed.

14. The robot according to claim 12, wherein the control unit is configured to release the alignment of the tool upon detecting that the movement of the robot has been resumed.

15. The robot according to claim 12, wherein the control unit is configured to determine the angle ($V_x$, $V_y$, $V_z$) of the tool in relation to the specified axis ($X_w$, $Y_w$, $Z_w$), and to adjust the orientation of the tool so that the tool is aligned with the specified axis if the angle of the tool in relation to the specified axis is less than a limit value.

16. The method according to claim 2, wherein the tool is kept aligned with the specified axis ($X_w$, $Y_w$, $Z_w$) until detecting that the movement of the robot has been resumed.

17. The method according to claim 2, wherein the method includes releasing the alignment of the tool upon detecting that movement of the robot has been resumed.

18. The method according to claim 2, wherein the method includes:
determining the angle ($V_x$, $V_y$, $V_z$) of the tool in relation to the specified axis, and
adjusting the orientation of the tool so that the tool is aligned with the specified axis ($X_w$, $Y_w$, $Z_w$) if the angle of the tool in relation to the specified axis is less than a limit value.

19. The method according to claim 2, wherein the method is repeated as long as the alignment function is activated.

20. The robot according to claim 13, wherein the control unit is configured to release the alignment of the tool upon detecting that the movement of the robot has been resumed.

* * * * *